(12) United States Patent
Qiang

(10) Patent No.: US 10,708,173 B2
(45) Date of Patent: Jul. 7, 2020

(54) MULTIPATH FORWARDING IN AN OVERLAY NETWORK

(71) Applicant: Zu Qiang, Kirkland (CA)

(72) Inventor: Zu Qiang, Kirkland (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 58 days.

(21) Appl. No.: 15/580,115

(22) PCT Filed: Jun. 3, 2016

(86) PCT No.: PCT/IB2016/053286
§ 371 (c)(1),
(2) Date: Dec. 6, 2017

(87) PCT Pub. No.: WO2016/199005
PCT Pub. Date: Dec. 15, 2016

(65) Prior Publication Data
US 2018/0139123 A1 May 17, 2018

Related U.S. Application Data

(60) Provisional application No. 62/174,945, filed on Jun. 12, 2015.

(51) Int. Cl.
*H04L 12/707* (2013.01)
*H04L 12/715* (2013.01)
*H04L 12/725* (2013.01)
*H04L 12/741* (2013.01)
*H04L 29/12* (2006.01)

(52) U.S. Cl.
CPC ............ *H04L 45/24* (2013.01); *H04L 45/308* (2013.01); *H04L 45/64* (2013.01); *H04L 45/745* (2013.01); *H04L 61/103* (2013.01)

(58) Field of Classification Search
CPC ..... H04L 45/24; H04L 45/745; H04L 45/308; H04L 45/64; H04L 61/103
See application file for complete search history.

(56) References Cited

U.S. PATENT DOCUMENTS

| | | | |
|---|---|---|---|
| 8,861,382 B2 | 10/2014 | Hirano et al. | |
| 10,038,629 B2 * | 7/2018 | Fang | G06F 9/45558 |
| 2012/0303822 A1 | 11/2012 | Huang et al. | |
| 2014/0086253 A1 * | 3/2014 | Yong | H04L 12/4633 370/395.53 |
| 2014/0233569 A1 | 8/2014 | Yong et al. | |

OTHER PUBLICATIONS

Z. Qiang, Tenant Traffic Handling in NV03, Network Working Group, Internet Draft, Feb. 6, 2015, 12 pages.
(Continued)

*Primary Examiner* — Afshawn M Towfighi
(74) *Attorney, Agent, or Firm* — David J Rahmer; Ericsson Canada Inc.

(57) ABSTRACT

The use of overlay networks, such as Network Virtualization using Overlays over Layer 3 (NVO3), is a growing trend to address networking issues in data centers that make use of virtualization and cloud computing techniques. Additional considerations may be required to support multipath forwarding scenarios.

20 Claims, 9 Drawing Sheets

(56) References Cited

OTHER PUBLICATIONS

Junghee Han et al., Enhancing end-to-end availability and performance via topology-aware overlay networks, Elsevier, Computer Networks 52—2008—pp. 3029-3046.
M. Lasserre et al., Framework for Data Center (DC) Network Virtualization, IETF, RFC 7365, Oct. 2014, 26 pages.
T. Narten et al., Problem Statement: Overlays for Network Virtualization, IETF, RFC 7364, Oct. 2014, 23 pages.
M. Mahalingam et al., Virtual eXtensible Local Area Network (VXLAN): A Framework for Overlaying Virtualized Layer 2 Networks over Layer 3 Networks, Independent Submission, RFC 7348, Aug. 2014, 22 pages.
IETF ongoing discussion: http://www.ietf.org/mail-archive/web/nvo3/current/msg02750.html, Sep. 17, 2013, 3 pages.
L. Yong et al., Use cases for Data Center Network Virtualization Overlay Networks, IETF, RFC 8151, May 2017, 16 pages.
D. Black et al., An Architecture for Data-Center Network Virtualization over Layer 3 (NV03), IETF, RFC 8014, Dec. 2016, 35 pages.
N. Bitar et al., NV03 Data Plane Requirements, IETF, Internet Draft, Apr. 15, 2014, 18 pages.
S. Hartman et al., Network Working Group, Internet Draft, Security Requirements of NV03, Jun. 14, 2016, 19 pages.
ISR from corresponding application PCT/IB2016/053286.

* cited by examiner

| TS ID | Inner Destination NVE Address | Destination NVE ID | Outer Destination NVE address | Policy |
|---|---|---|---|---|
| 1 | 192.1.1.1 | X-1 | 142.1.0.1 | Primary |
| 1 | 192.1.1.1 | X-1 | 142.1.0.2 | Secondary |
| 1 | 192.1.1.2 | X-1 | 142.1.0.1 | TS active |
| 2 | 192.2.1.1 | Y-1 | 142.2.0.1 | LoadBalance |
| 2 | 192.2.1.1 | Y-2 | 142.2.0.2 | LoadBalance |

MULTIPATH FORWARDING IN AN OVERLAY NETWORK

This application is a 35 U.S.C. § 371 national phase filing of International Application No. PCT/IB2016/053286, filed Jun. 3, 2016, which claims the benefit of U.S. Provisional Application No. 62/174,945, filed Jun. 12, 2015, the contents of which are incorporated herein by reference in their entireties.

TECHNICAL FIELD

This disclosure relates generally to systems and methods for handling multipath forwarding in a communication network.

BACKGROUND

In computer and communication networks, an overlay network is a network that is built on top of another, underlying network. Overlay network nodes are connected by virtual or logical links which can be mapped to the underlying (e.g. physical) links.

Network Virtualization using Overlays over Layer 3 (NVO3) is a technology that is used to address networking and addressing issues that can arise in building large, multi-tenant data centers that make extensive use of server virtualization.

In the NVO3 architecture, a Network Virtualization Authority (NVA) is a network entity that provides reachability and forwarding information to Network Virtualization Edge (NVE) nodes. The NVA can also be considered as a network controller. A tenant system (TS) can be attached to an NVE node, either locally or remotely. The NVE can be capable of providing Layer 2 (L2) and/or Layer 3 (L3) services, where an L2 NVE provides Ethernet local area network (LAN)-like service, and an L3 NVE provides Internet Protocol/Virtual Routing and Forwarding (IP/VRF)-like service.

FIG. 1 illustrates an example NVO3 architecture with four NVEs 102/104/106/108, each attached to at least one tenant system or network, in communication with a common NVA 110 in the overlay network 100.

In the example network of FIG. 1, NVE 102 is connected to tenant systems 112 and 114. NVE 104 is connected to tenant systems 116 and 118. NVE 106 is connected to tenant system 120 via network 122. NVE 108 is attached to tenant system 124.

An NVE is the network virtualization function that sits at the edge of an underlay network and implements L2 and/or L3 tenant separation and for hiding tenant addressing information (e.g. media access control (MAC) addresses and internet protocol (IP) addresses), tenant-related control plane activity and service contexts from the underlay nodes. NVE components may be used to provide different types of virtualized network services. NVO3 architecture allows IP encapsulation or Multiprotocol Label Switching (MPLS) encapsulation. The network-facing side of the NVE can use the underlying L3 network to tunnel frames to and from other NVEs. The tenant-facing side of the NVE can send and receives Ethernet frames to and from individual Tenant Systems. An NVE could be implemented as part of a virtual switch within a hypervisor, a physical switch or router, a Network Service Appliance, or be split across multiple devices.

Gateway and/or distributed gateway functions can also be specified in order to provide L3 forwarding and routing function in the NVO3 architecture. An NVA-NVE protocol can be used to configure the inner-outer address mapping table to be used by an NVE in routing traffic.

In some cases, a tenant system may become unreachable via its attached virtual access point, for example if the virtual network interface card (vNIC) is disabled by the tenant system. In this case, a remote NVE may not be aware of the virtual access point status changes and data traffic destined for the tenant system will still be forwarded over the overlay network. This traffic will be simply dropped by the attached NVE.

In another case, when an NVE is physically separated from the attached tenant system(s), a tenant system may attach to more than one NVE via the virtual access points. As such, the NVE can be considered to be "multi-homed". That is, an NVE may have more than one IP address associated with it on the underlay network or alternatively, a specific tenant system may be reachable through more than one NVE. Multi-homed NVEs introduce complexities for tenant unicast and multicast traffic forwarding. In the specific case where tenant system data plane dynamic routing is supported, the NVE may need to determine a routing decision at data forwarding. Further, a virtual router installed at a tenant system can dynamically update its routing preference using a routing protocol. Similar to the above issue, a peer NVE has no way to learn this update and change its stored data forwarding rule accordingly.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for handling packet traffic by an overlay network node. The method comprises receiving a data path notification message from a peer node, the data path notification message including forwarding policy information. A packet is received, the packet having a first overlay network address destination. It is determined that the first overlay network address maps to a plurality of underlay network addresses. One of the plurality of underlay network addresses is selected in accordance with the received forwarding policy information. The packet is forwarded to the selected underlay network address.

In another aspect of the present invention, there is provided an overlay network node comprising circuitry including a processor and a memory, the memory containing instructions executable by the processor whereby the overlay network node is operative to receive a data path notification message from a peer node, the data path notification message including forwarding policy information. The overlay network node receives a packet, the packet having a first overlay network address destination. It is determined that the first overlay network address maps to a plurality of underlay network addresses. The overlay network node selects one of the plurality of underlay network addresses in accordance with the received forwarding policy information and forwards the packet to the selected underlay network address.

In another aspect of the present invention, there is provided a network virtualization edge node comprising a receiving module for receiving a data path notification message from a peer node, the data path notification message including forwarding policy information, and for receiving a packet, the packet having a first overlay network address destination; an address mapping module for determining that the first overlay network address maps to a plurality of underlay network addresses; a data path policy module for selecting one of the plurality of underlay network addresses in accordance with the received forwarding policy information; and a transmitting module for forwarding the packet to the selected underlay network address.

In some embodiments, the forwarding policy information can be indicated in an encapsulation header of the data path notification message. The forwarding policy information can be based at least in part on user plane signaling received by the peer node from a tenant system.

In some embodiments, the forwarding policy information can indicate one or more of the following non-limiting examples: a preferred underlay network path for reaching the first overlay network address, that packet traffic addressed to the first overlay network address is to be load balanced between the plurality of underlay network addresses, and/or a status of a tenant system associated with the first overlay network address.

In some embodiments, an overlay network to underlay network address mapping table can be updated in accordance with the received forwarding policy information. In some embodiments, a tenant system attached to the overlay network node can be informed of the forwarding policy information.

In some embodiments, the step of determining that the first overlay network address maps to a plurality of underlay network addresses can include looking up the first overlay network address in an overlay network to underlay network address mapping table.

In some embodiments, the overlay network can be a NVO3 network and the overlay network node can be a NVE.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is an example inner-outer address mapping table;

DETAILED DESCRIPTION

Figure 1:
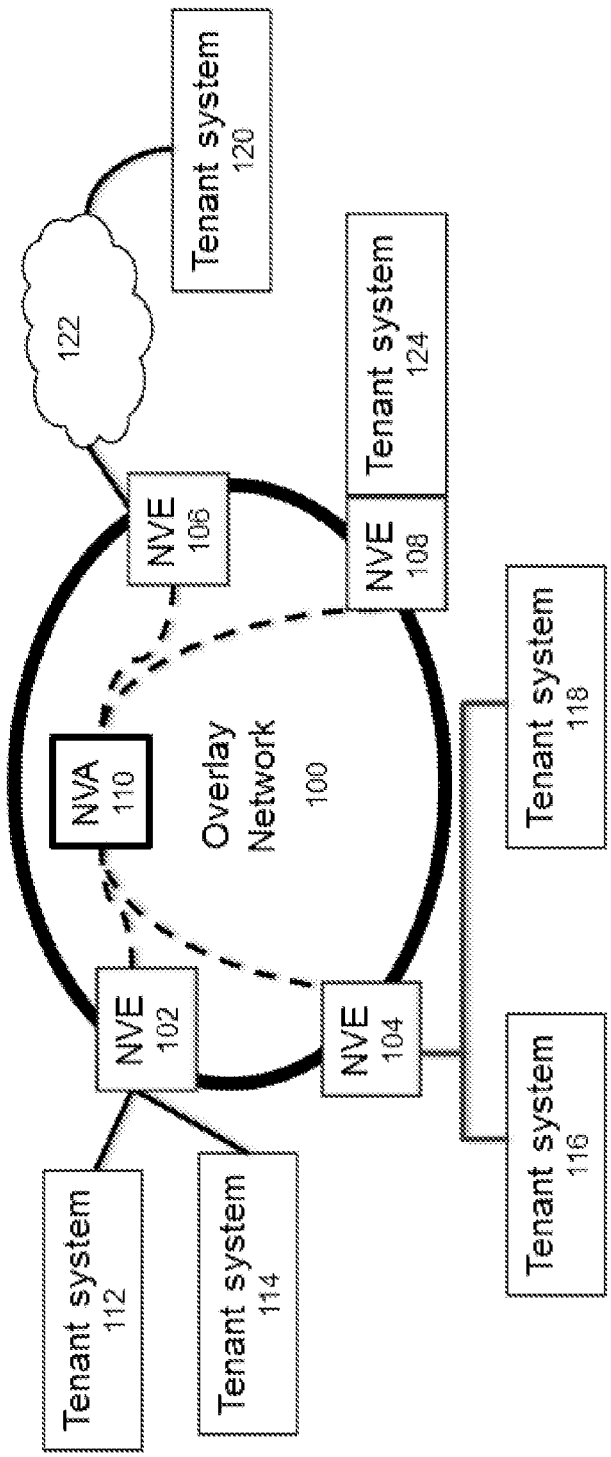
FIG. 1 illustrates an example NVO3 architecture.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the present disclosure are directed to mechanisms for defining a peer-to-peer interaction which allows an overlay network node, such as an NVE, to notify its peer(s) with data path status information. This notification mechanism can be supported by the overlay network, such as NVO3, architecture.

In NVO3, an L2 NVE can implement Ethernet LAN emulation, an Ethernet-based multipoint service similar to the Internet Engineering Task Force (IETF) Virtual Private LAN Service (VPLS) or Ethernet Virtual Private Network (EVPN) service. It can forward multicast and unicast L2 traffic between tenant systems. From the tenant system perspective, a NVE appears similar to an L2 bridge, for example as specified in the Institute of Electrical and Electronics Engineers (IEEE) 802.1Q networking standard.

A L3 NVE can provide Virtualized IP forwarding service, similar to IETF IP VPN (e.g. Border Gateway Protocol (BGP)/Multiprotocol Label Switching (MPLS) IP VPN as defined in IETF RFC 4364). An L3 NVE can provide inter-subnet L3 switching/routing for a tenant system. The NVE is the first hop or next hop router to the attached tenant system.

In NVO3, it is common to provide both L2 and L3 services to a tenant system. In the logical view, the tenant system is attached to a NVE which provides both L2 and L3 function. In implementation, the L2 NVE function and L3 NVE function can be collocated. The L2 NVE function can provide intra-subnet traffic forwarding. The L3 NVE function can provide inter-subnet traffic forwarding.

In NVO3, to avoid any flooding issues, an inner-outer address mapping table is configured using the NVA-NVE control signaling, as is proposed in the IETF draft "Network Virtualization NVE to NVA Control Protocol Requirements" [draft-ietf-nvo3-nve-nva-cp-req]. Both L2 and L3 data forwarding are based on the inner-outer address mapping table lookup.

Those skilled in the art will appreciate that such an inner to outer address mapping table should be maintained at each NVE in an overlay network, mapping tenant system (inner) addresses to the underlying network (outer) addresses of remote NVEs. When presented with a data packet to forward to a tenant system within a (virtual) overlay network, the NVE needs to know the mapping of the overlay network destination (inner) address to the (outer) address on the underlay network of the remote NVE which can deliver the packet to the destination tenant system. Conventionally, an NVA-NVE protocol is used to provide this inner to outer mapping to each NVE and to keep it updated in a timely manner.

The data forwarding procedure is similar for both an L2 NVE and an L3 NVE. Upon receiving a unicast packet from the tenant system, the NVE performs a lookup in the inner-outer address mapping table using the received destination IP/MAC address. If a mapping is found, the received packet will be encapsulated and forwarded to the destination NVE. If no mapping is found, the received unknown unicast packet should be dropped. As an alternative, the inner-outer address mapping table updating procedure may be triggered using the NVA-NVE control signaling. However, an attacker may generate large amount of unknown unicast packets from a compromised virtual machine (VM), which can result a denial of service (DOS) attack. Therefore, for security reasons, the inner-outer address mapping table updating procedure should preferably not be triggered often. One mechanism to avoid this type of security issue is to implement a frequency limitation function when processing tenant system traffic with unknown destination addresses.

For a L2 NVE, the virtual access point is an emulation of a physical Ethernet port. It shall have the capability to handle any L2 Control Protocols (L2CP).

The Spanning Tree Protocol (STP) is a L2 protocol that ensures a loop-free topology for any bridged Ethernet local area network. STP was originally standardized as IEEE 802.1d. It is deprecated as of 802.1d-2004 in favor of Rapid Spanning Tree Protocol (RSTP). The Multiple Spanning Tree Protocol (MSTP) defines an extension to RSTP to further develop the usefulness of VLANs.

In an NVO3 network, the L2 forwarding/switching function provided by a NVE is typically based on the destination MAC address of a packet and the inner-outer address mapping table stored by the NVE. There should not be any looping of L2 connections among the tenant systems by the NVEs if the NVE inner-outer address mapping table is configured correctly. Therefore, there is typically no need to use any L2CP for that purpose among the participating NVEs of a tenant system. However, STP/RSTP/MSTP may be used by the tenant system, including the multi-homing scenario.

In the NVO3 network, the NVE does not need to propagate any STP messages to the remote NVEs. But, the NVE may need to learn the Root Bridge MAC address and Bridge Priority of the root of the Internal Spanning Tree (IST) of the attached L2 segment by listening to the Bridge Protocol Data Units (BPDUs). The NVE does not necessarily need to forward the L2CP message, but it may need to participate.

Link Aggregation [as described in IEEE 802.1AXbk-2012] is a mechanism for making multiple point-to-point links between a pair of devices appear to be a single logical link between those devices. A L2 NVE does not have to be involved in the Link Aggregation procedure. It only needs to encapsulate and forward any Link Aggregation Control Protocol Data and data packets between the participating tenant systems. The NVE does not necessarily need to be involved, but it may need to forward the messages.

For an L2 service, it is not a must for a NVE to support any special processing of Address Resolution Protocol (ARP) [as described in IETF RFC 826] and/or IPv6 Neighbor Discovery (ND) [as described in IEFT RFC 4861] in the NVO3 architecture. The NVE can forward the ARP or ND messages using the multicast capability. However, as a performance optimization, an NVE does not need to propagate the ARP or ND messages. It can intercept ARP or ND requests received from its attached tenant system and respond based on the information configured in the inner-outer address mapping table. Although the NVE does not have to forward the ARP or ND messages, it may need to respond to the received messages based on the inner-outer address mapping table for performance optimization.

Upon receiving an ARP or ND request from a tenant system, the NVE can send the ARP or ND response with the requested MAC address back. The NVE may perform an ARP or ND proxy when responding the ARP or ND request. If the NVE does not have the interested MAC information in the receiving ARP or ND request, it may query the NVA using the NVA-NVE control signaling. However, an attacker may generate large amount of ARP/ND request packets from a compromised VM, which may result in a denial of service attack. Therefore for security reasons, the inner-outer address mapping table updating procedure should not be triggered too frequently. One mechanism to avoid this type of security issue is to also implement a frequency limitation function at processing tenant system ARP/ND request messages.

In the multi-homing NVE scenario, a tenant system can be reachable via more than one NVE. In this case, if ARP/ND proxy is supported at the participating NVEs of the same network segment where a tenant system is attached, all participating NVEs may be aware of the same location of the traffic's destination. Therefore, all participating NVEs may offer their own MAC addresses for the same destination IP address in the ARP/ND reply message, which could result in a racing issue. One NVE may need to be selected by the NVA at each network segment to avoid such a racing issue. Only the selected NVE can response to the ARP/ND request at the attached network segment. Accordingly, the NVA may need a mechanism to select one NVE per network segment of a tenant system to be the ARP/ND proxy of a given destination IP addresses to avoid a racing issue.

In a VM mobility scenario, a VM may be moved from one L2 segment to another L2 segment, assuming that IP address preservation is supported. To optimize the ARP or ND updating procedure, both the source NVE and the target NVE can have the same MAC address configured at the virtual access point where the tenant system attached. Accordingly, the NVA may need a mechanism to configure the participating NVEs with the same MAC address on the virtual access point of the same virtual network at each network segment. However, in multi-homing NVE scenarios, the NVA may need a mechanism to configure the participating NVEs on the virtual access point of the same virtual network at each network segment to avoid a duplicated MAC address issue.

An IP routing protocol may be used by a tenant system for dynamic IP routing. A routing protocol can specify how routers communicate with each other, disseminating information that enables them to select routes between any two nodes on a computer network. In NVO3, there are different functions for supporting L3 services including a centralized gateway function, a distributed gateway function, or both.

If a L3 service is provided by a NVO3 Centralized Gateway function, the tenant system routing function and the NVO3 Centralized Gateway function can appear as routers adjacent to one another. A routing protocol may be used between the routers for the overlay data plane. Any tenant system routing messages (e.g. a routing update message from a virtual routing function installed in a VM of the tenant system) will be handled by the NVO3 Centralized Gateway function. Once there is a routing rules installation or update, the NVO3 Centralized Gateway function may update its routing distribution polices and forward data packets accordingly. The user data packet is forwarded by the attached NVE to the NVO3 Centralized Gateway function. Then the NVO3 Centralized Gateway function can make the L3 routing decision to either discard the packet or tunnel it to a destination NVE where the destination VM is attached. In this case, the NVE functions, at both source and destination, only need to support L2 functionalities.

If a L3 service is provided by a NVO3 Distributed Gateway function embedded in an L3 NVE, this can be an issue for dynamic routing updates. In the tenant view, the Distributed Gateway function appears as a next hop router to the tenant system routing functions (e.g. virtual routing functions installed in a VM of the tenant system). The Distributed Gateway function embedded in the L3 NVE may need to support one or more routing protocols (e.g. BGP/Open Shortest Path First (OSPF)/Routing Information Protocol (RIP)) to learn any tenant system routing rules installation or updates. This allows a L3 NVE and the attached tenant system router to learn the IP routes updates from each other. However, as the tenant system packet forwarding in the L3 NVE is based on the inner-outer address mapping table configured by the NVA (e.g. using a NVA-NVE control protocol), a tenant system routing updates could also trigger a corresponding inner-outer address mapping table update. This can occur not only in the attached L3 NVE, but also in the remote participating L3 NVEs. These dynamic updates should be handled appropriately.

In the above described scenarios, as a particular NVE may not be aware of tenant system routing preferences, dynamic routing updates, multi-homing routing, etc., the packet routing/forwarding decisions cannot be made accordingly. The NVA and/or NVEs require a mechanism to enable a NVE to make such a packet handling decision.

Figure 2:
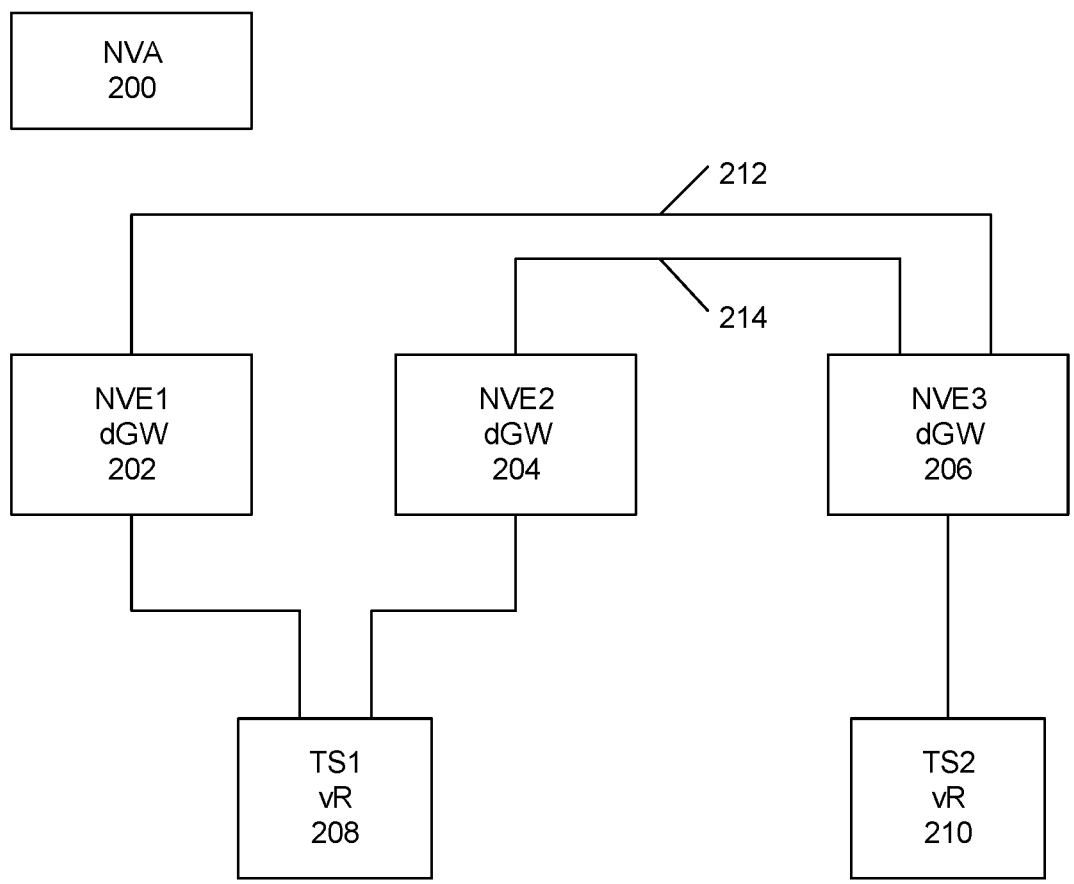
FIG. 2 illustrates an example overlay network with multiple forwarding paths.

FIG. 2 is an example overlay network with multiple forwarding paths available between the tenant systems. FIG. 2 will be used to illustrate examples of the interactions between the distributed gateway function and the virtual router in a tenant system. Example tenant system TS1 208 is shown as attached to both NVE1 202 and NVE2 204. Tenant system TS2 210 is attached to NVE3 206. Both TS1 208 and TS2 210 can have virtual routing (vR) functions enabled. The distributed gateway function (dGW) is supported in NVE1 202, NVE2 204 and NVE3 206. In the example of FIG. 2, the vR function in TS1 208 and the dGW in NVE1/NVE2 202/204 can be considered routing peers. The vR in TS2 210 and the dGW in NVE3 206 can also be considered routing peers. It will be appreciated that two distinct forwarding paths are available between TS1 208 and TS2 210. Packets transmitted between TS1 208 and TS2 210 can be forwarded using the NVE1-NVE3 tunnel 212 or the NVE2-NVE3 tunnel 214 based on the configured inner-outer address mapping table.

An issue that may occur is that a tenant system may want to change the routing policies at some point in time. For instance, initially the NVE3 206 can be configured with a routing policy that any traffic destined from TS2 210 to TS1 208 should be forwarded using the NVE3-NVE1 tunnel 212. At some point, TS1 208 may decide to change that policy. For example, TS1 208 would prefer to use the route from NVE2-NVE3 214 for any traffic destined for TS2 210. Or, alternatively, there may be a new route available (e.g. a new subnet installed in TS1) and it would prefer to use the route from NVE2-NVE3 214 for the newly installed subnet. For any of the above routing/forwarding policy update scenarios, both NVE1 202 and NVE2 204 can be informed by TS1 208 using a routing protocol, for example. Upon receiving the routing update messages, both NVE1 202 and NVE2 204 can process it and update their stored inner-outer address mapping tables accordingly. However, in some embodiments, this inner-outer address mapping table update may only be applicable for traffic forwarding from TS1 208 to TS2 210. An issue remains on how to update NVE3 206 with respect to traffic forwarding in the opposite direction (e.g. from TS2 210 to TS1 208), as NVE3 206 may also require an update to its stored inner-outer address mapping table.

A number of alternatives can be considered to solve this issue. Disallowing the support of a dynamic routing function in the overlay network would be an easy implementation option, but would result in missing functionality.

NVE-NVE interaction messages can be used to flood the peer L3 NVEs. For example, a L3 NVE could inform its peer NVEs with the received routing updates information. However, in this case, a peer NVE would update its inner-outer address mapping table without any involvement of the NVA 200. This may be challenging the NVA's centralized control role and may also cause security violation concerns.

NVA-NVE signaling can be used to update the peer L3 NVEs. In this case, the L3 NVE would not forward routing update information to its peer NVEs. Instead, the NVE 202/204/206 would always inform the NVA 200 with any routing changes. Then the NVA 200 can use NVA-NVE signaling to distribute the inner-outer address mapping table update to the other peer NVEs.

A collocated NVA 200 and gateway function can also be considered. With this alternative, the tenant system routing policies can be managed by the collocated gateway function. It can be assumed that the NVA 200 will be synchronized with the collocated gateway function. The distributed gateway function embedded in the NVE 202/204/206 is installed with the tenant system's IP forwarding policies (i.e. the Forwarding information base (FIB) or inner-outer address mapping table). The tenant system routing messages and/or user plane signaling will be terminated at the gateway function, which is the next hop router of the tenant system routing function. Whenever there are any tenant system routing installations and/or updates, the collocated gateway function can update the routing policies and the NVA 200 will notify the distributed gateway functions with the updated inner-outer address mapping table using the NVA-NVE control signaling.

An alternative approach is to define a data path notification (DPN) message which can be used to update a peer NVE with a data path status change information (e.g. forwarding policy information). Upon receiving the DPN message, a NVE 202/204/206 can update the policies of the indicated data path, for example in its inner-outer address mapping table. These policies can subsequent be used for tenant system data forwarding. This DPN message can include a security header, the tenant system identifier, the data path identifier (or the NVE underlay address), the data path status information, and other relevant information.

The data path status information can be specified based on the specific needs. For instance, it can contain such status information such as tenant system active, tenant system deactivated, primary data path, secondary data path, pending data path, equal data path (e.g. load balance), and others.

The transmission of a DPN message may be triggered by an event, for example, a status change in the NVO3 network hardware or software which has an impact on the corresponding data path. Some non-limiting examples of such events are:

"Tenant system active" or "Tenant system deactivated". Note that the tenant system can use any data plane messages (e.g. STP) to indicate its activation status.

"Data Path active" or "Data Path deactivated". This can be triggered by a switch-over or fail-over decision made at the NVE and/or NVA.

"Primary data path", "Secondary data path", "Pending data path". This can be a dynamic routing update received from a tenant system where the virtual routing function is supported.

There are numerous implementation options for transmitting such a DPN message including forwarding policy information. A new NVO3 control message can be specified for this purpose only. A generic NVE-NVE signaling message format may be used. However, this option may have an impact on the NVO3 architecture in which NVE-NVE control plane signaling is not generally supported. Another alternative is to reuse the existing data plane encapsulation header for NVE-NVE interaction notification. There are multiple data plane encapsulation formats possible for use in NVO3, including Virtual Extensible LAN (VxLAN), Network Virtualization using Generic Routing Encapsulation (NVGRE), Stateless Transport Tunneling (STT), VxLAN Generic Protocol Extension (VxLAN-GPE), Generic Network Virtualization Encapsulation (GENEVE), Generic UDP Encapsulation (GUE), and others.

Each of these encapsulation formats have an encapsulation header specified. Regardless of the format used, a new flag or indicator in the encapsulation header can be specified which indicates to the receiving NVE that this is not a typical tenant system data packet and specific handling/processing is required. The receiving NVE then can process the DPN appropriately. The default value of the flag can be set to zero, indicating a normal encapsulation data packet. As the encapsulation header format can already include the tenant system ID, tenant system address, and NVE underlay address, it may be necessary to only add the forwarding policy information as additional information. When the flag is set (e.g. set to 1), a new extension option can be appended to contain this additional data path information.

When a tenant system data packet is received at the ingress NVE, it will perform the inner-outer address mapping lookup. When a matched entry is found, any policies associated with the matched entry can be taken into consideration before encapsulation. For instance, if the policy is "tenant system is deactivated", the tenant system data packet can be dropped without any processing.

If more than one entry is found as a result of the address mapping lookup, all of the policies associated with the matched entries can be taken into consideration when making the packet forwarding decision. For instance, if both entries indicate "tenant system is active", then only the primary data path should be selected for the data forwarding. If only one entry is set as "tenant system is active", then only the corresponding NVE address should be used for the packet encapsulation.

In some embodiments, to avoid security risks, the DPN message will not be used for a "full" update to the inner-outer address mapping table, meaning that it cannot be used to add or remove entries in the table. It can only be used to update the policies/data path status information of an existing entry in the table.

A security header can be optionally added which can prevent or mitigate a security attack (e.g. man-in-middle attack or denial of service attack). The security header can be implemented to include a key configured by the NVA. The NVA can be used to configure a NVE by which a peer NVE can update which inner-outer address mapping table entry and which corresponding key is to be used. An authorized list can be configured in the NVE by the NVA using a NVA-NVE control signaling. A key-based authentication and authorization means that only an authorized NVE peer can send a DPN message.

FIG. 3 is an example inner-outer address mapping table 300. In an exemplary embodiment, the inner-outer mapping table 300 is stored in a NVE named NVE-0. Tenant system TS1 has two remote addresses, 192.1.1.1 and 192.1.1.2. Address 192.1.1.1 is reachable via NVE X-1 using with two different underlay addresses, 142.1.0.1 and 142.1.0.2. The default policy is to use address 142.1.0.1 as the primary path for forwarding packets to NVE X-1. Address 192.1.1.2 is reachable via NVE X-1 with underlay address 142.1.0.1 only. Tenant system TS2 has remote address 192.2.1.1 reachable via both NVE Y-1 and NVE Y-2. The default policy is to load balance packets destined for overlay address 192.2.1.1 between NVE Y-1 and NVE Y-2. The default policies can be configured by the NVA at setup.

In a first example, the tenant system with the address 192.1.1.2 of TS1 may be disconnected. NVE X-1 can send a DPN message to NVE-0 to indicate "TS deactivated" at TS1 with address 192.1.1.2. In that case, any received data packet of TS1 with a destination address of 192.1.1.2 will be dropped by NVE-0 without any processing.

In a second example, the tenant system with the address 192.2.1.1 of TS2 may want to receive incoming data traffic via NVE Y-2 only. A DPN message can be used by the tenant system to communicate with the attached NVE Y-1 and NVE Y-2. NVE Y-2 can send a DPN message to inform NVE-0 that the policies of the table entry corresponding to destination 192.2.1.1 and NVE Y-2 should be updated to "Primary". Then NVE Y-1 can send a DPN message to inform NVE-0 that the policies of the table entry corresponding to 192.2.1.1 and NVE Y-1 should be updated to "Secondary".

In a third example, NVE X-1 may decide to switch-over traffic with a destination address of 192.1.1.1 to the underlay address 142.1.0.2. NVE X-1 can send a DPN message to inform NVE-0 that the policies of that corresponding table entry should be updated to "Primary". Similarly, NVE X-1 can send a DPN message to inform NVE-0 that the table entry corresponding to underlay address 142.1.0.1 should be updated to "Secondary".

As previously discussed, the above example procedures can be performed without the involvement of the NVA. However in some embodiments, some NVE-NVA signaling may also be required for updating the NVA with any policy/data path status changes.

Those skilled in the art will appreciate that although some embodiments are described with respect to the NVO3 architecture, the various embodiments described herein can be applicable to any type of overlay network.

Figure 4:
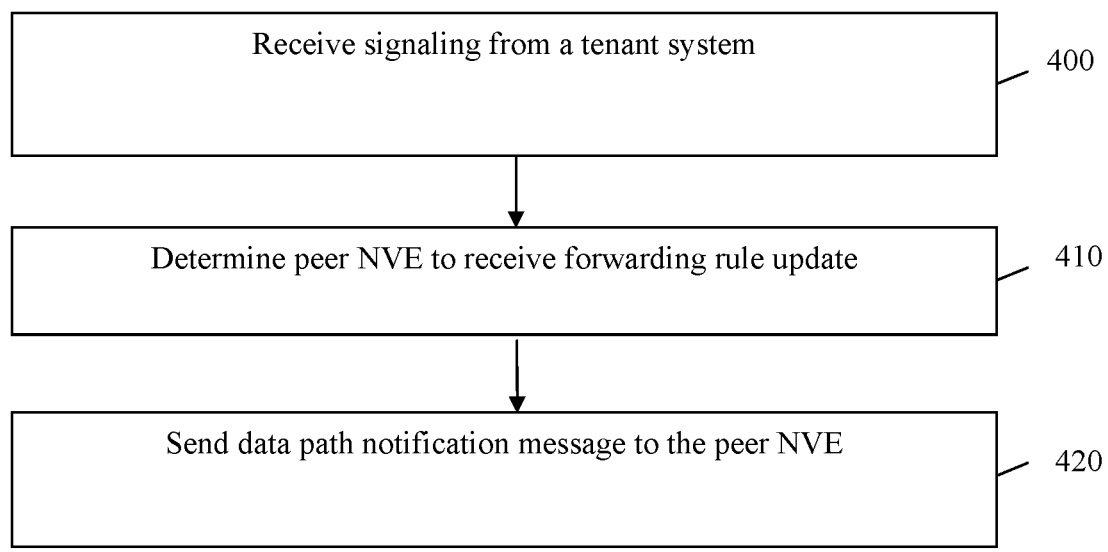
FIG. 4 is a flow chart illustrating a method for distributing a forwarding rule update.

FIG. 4 is a flow chart illustrating a method for distributing a forwarding rule or forwarding policy update. The method of FIG. 4 can be implemented by an overlay network node such as an NVE. The method begins by receiving signaling from a tenant system at an NVE (block 400). The signaling can be user plane signaling sent from the tenant system to the NVE. The signaling can include a configuration message and/or an update to at least one forwarding policy or rule. The signaling can indicate a routing preference for sending and/or receiving data traffic in a multipath routing scenario. The NVE determines at least one peer NVE to receive the forwarding rule update (block 410). This determination can be made by performing a lookup on an inner-outer mapping table stored in the NVE. The NVE can then compose and send a data path notification message to the identified peer NVE (block 420). The data path notification can include a flag to indicate that the message includes data path information. The data path information can indicate a preferred return routing path for reaching the tenant system attached to the NVE. The data path notification message can be encapsulated to include the received configuration message. The composed data path notification message can be then be sent to the identified peer NVE. The data path notification message can be transmitted to an underlay network address associated with the peer NVE. The NVE can optionally update its own stored inner-outer address mapping table in accordance with the received signaling.

Figure 5:
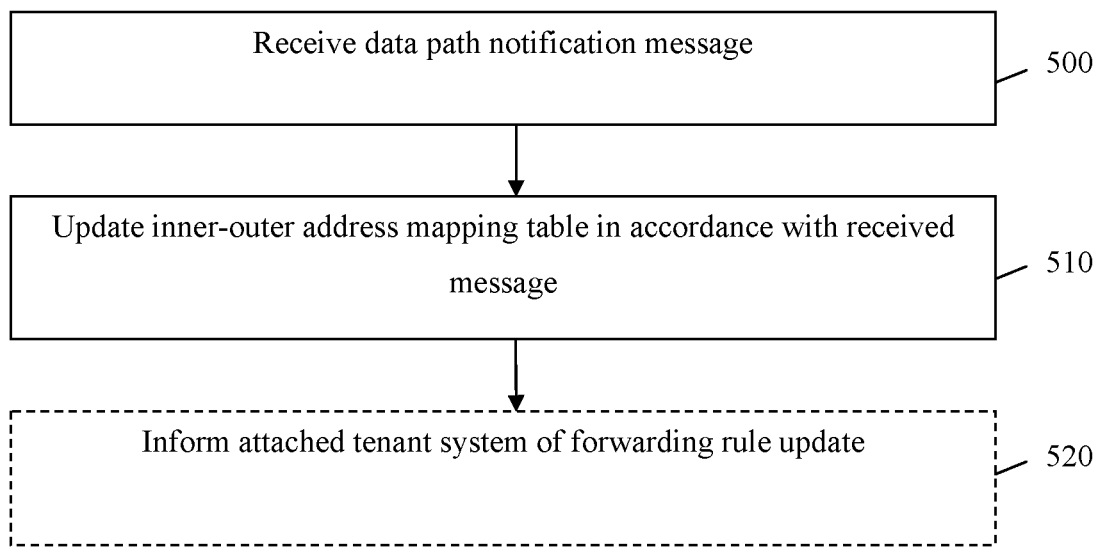
FIG. 5 is a flow chart illustrating a method for processing a forwarding rule update.

FIG. 5 is a flow chart illustrating a message for processing a forwarding rule update. The method of FIG. 5 can be implemented by an overlay network node such as an NVE. A data path notification message is first received by a NVE (block 500). The data path notification message can be received from a peer NVE in the overlay network. The data path notification message can include information related to a packet forwarding policy associated with a remote tenant. The data path notification message can specify status information associated with a particular NVE and/or a preferred path to reach the remote tenant when multiple paths are available. An inner-outer address mapping table stored in the NVE is updated in accordance with the received data path notification message (block 510). The NVE can then optionally inform its locally attached tenant system of the forwarding rule update related to the remote tenant, such that the local tenant can inform any other peer NVEs that may be involved in communication with the remote tenant of its data path preferences (block 520).

Figure 6:
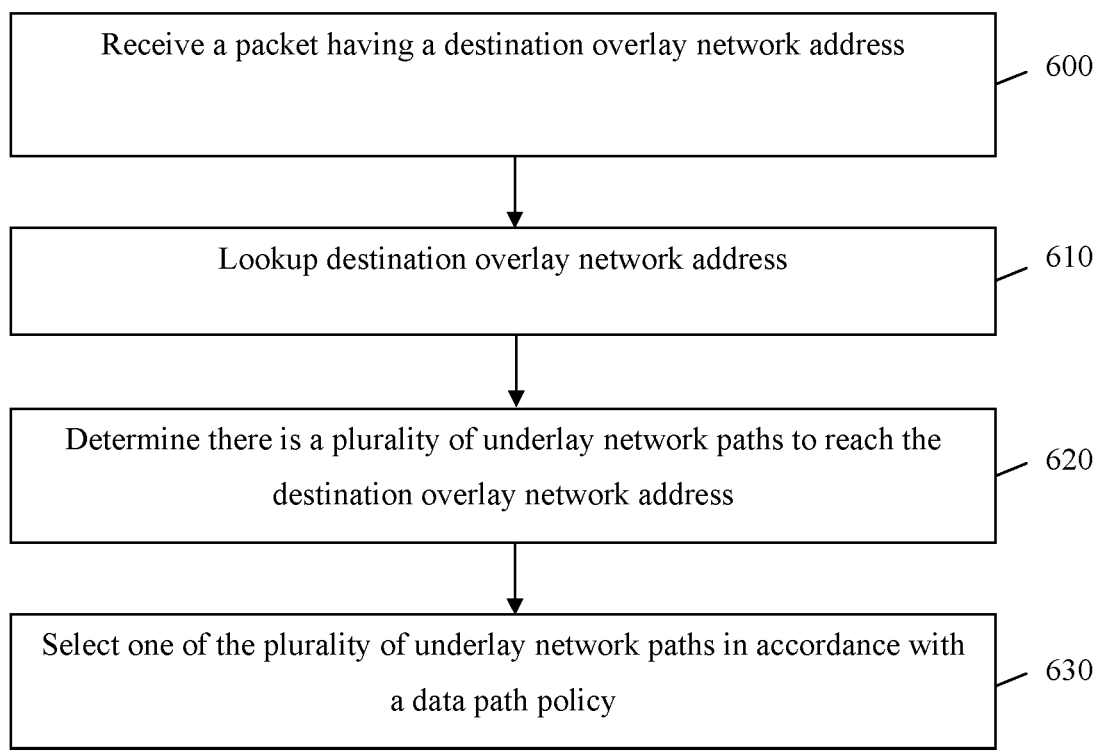
FIG. 6 is a flow chart illustrating a method for packet forwarding.

FIG. 6 is a flow chart illustrating a method for packet forwarding. The method of FIG. 6 can be implemented by an overlay network node such as an NVE. The method begins by receiving a packet by a NVE (block 600). The packet can be received from a tenant system or from another NVE in the overlay network. The packet can include a destination address, which can be an overlay network address. The NVE performs a lookup of the destination address in its stored inner-outer address mapping table (block 610). The lookup can be performed in order to map the overlay network address to at least one corresponding underlay network address. The NVE determines, as a result of the lookup or mapping operation, that the destination overlay network address maps to multiple underlay network addresses (block 620). In other words, there is a plurality of underlay network paths available to reach the destination overlay network address of the received packet. The NVE selects one of the plurality of underlay network addresses in accordance with a data path rule or policy (block 630). The data path policy can be stored in the inner-outer address mapping table. The received packet can then be encapsulated, with the selected underlay network address as the destination in the encapsulation header, and forwarded along the selected underlay network path.

Figure 7:
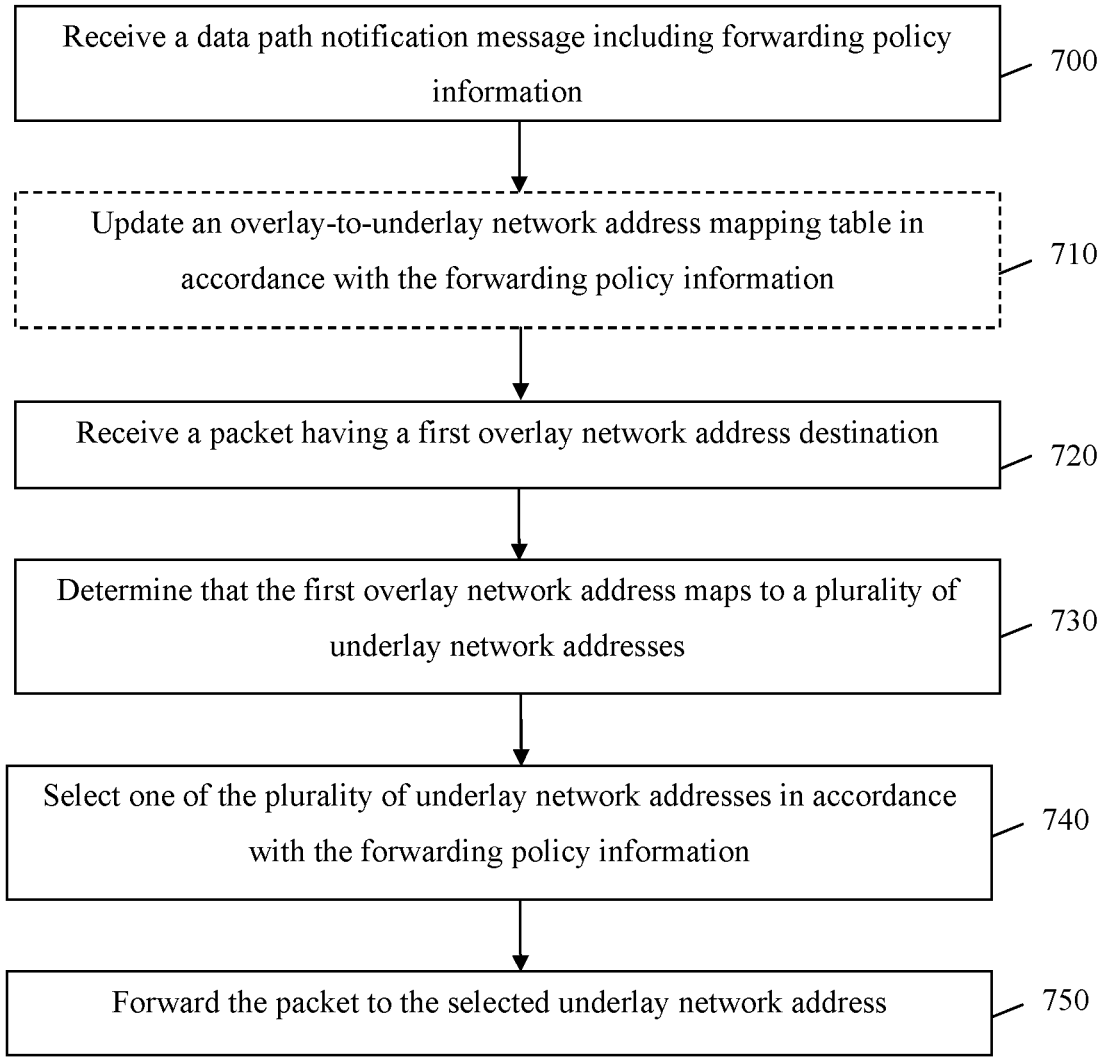
FIG. 7 is a flow chart illustrating a method for handling packet traffic.

FIG. 7 is a flow chart illustrating a method for handling packet traffic by an overlay network node. In some embodiments the overlay network node can be a NVE. In some embodiments the overlay network can be a NVO3 network. The method begins by receiving a data path notification message that includes forwarding policy information (block 700). The data path notification message can be received from a peer node in the overlay network. In some embodiments, the forwarding policy information can be indicated in an encapsulation header of the received data path notification message. The forwarding policy information can be derived from, or based at least partially on, user plane signaling that was received by the peer node from a tenant system.

Optionally, an overlay network to underlay network address mapping table can be updated in accordance with the received forwarding policy information (block 710). In some embodiments this can include modifying an existing inner-outer mapping table stored at the overlay network node to add the forwarding policy information to an entry associated with an overlay and/or underlay network address. Optionally, a tenant system attached to the overlay network node can be informed of the received forwarding policy information.

A packet is received by the overlay network node, the packet indicating a first overlay network address destination (block 720). The first overlay network address can be looked up in the overlay network to underlay network address mapping table to determine a corresponding destination underlay address. In some embodiments, it is determined that the first overlay network address maps to a plurality of underlay network addresses (block 730).

One of the plurality of underlay network addresses is then selected as the destination in accordance with the forwarding policy information associated with those underlay network addresses (block 740). The forwarding policy information can indicate to use a preferred underlay network path for reaching the first overlay network address, to load balance packet traffic addressed to the first overlay network address between multiple underlay network addresses, a status of a tenant system associated with the first overlay network address, or other network routing information.

The packet can then be forwarded to the selected underlay network address (block 750).

Figure 8:
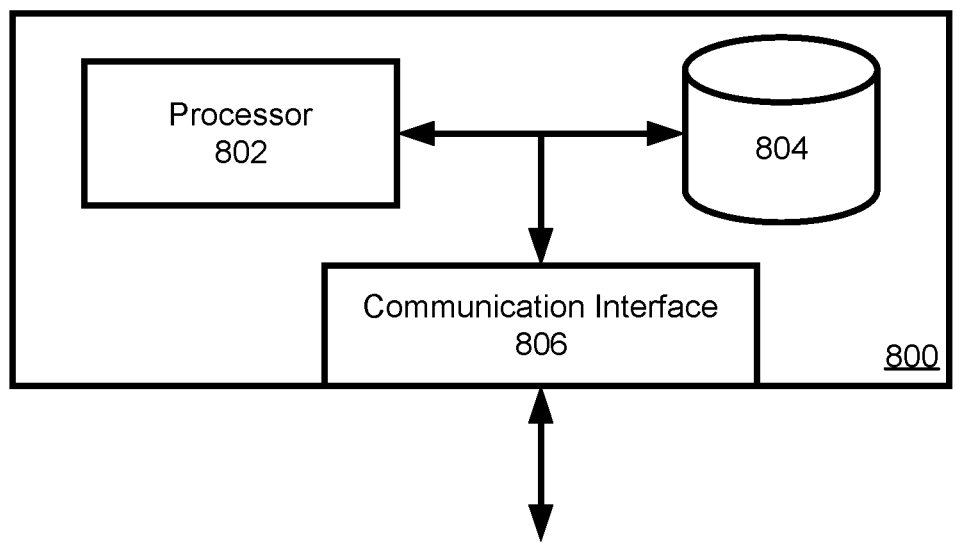
FIG. 8 is a block diagram of a network element.

FIG. 8 is a block diagram illustrating an example network element 800 according to embodiments of the present invention. Network element 800 can be any of the overlay network nodes, such as the NVE and/or NVA nodes, as have been described herein. The network element 800 includes circuitry including a processor 802, a memory or instruction repository 804 and a communication interface 806. The communication interface 806 can include at least one input port and at least one output port. The memory 804 contains instructions executable by the processor 802 whereby the network element 800 is operable to perform the various embodiments as described herein. In some embodiments, the network element 800 can be a virtualized application hosted by the underlying physical hardware. Network element 800 can be configured to implement any of the methods and procedures illustrated in FIGS. 4, 5, 6 and 7. According to some embodiments, network element 800 is operative to receive a data path notification message, including forwarding policy information, and to receive a packet having a first overlay network address destination. Network element 800 is operative to determine that the first overlay network address maps to a plurality of underlay network addresses and to select one of the plurality of underlay network addresses in accordance with the received forwarding policy information. Network element 800 is operative to forward the packet to the selected underlay network address.

Figure 9:
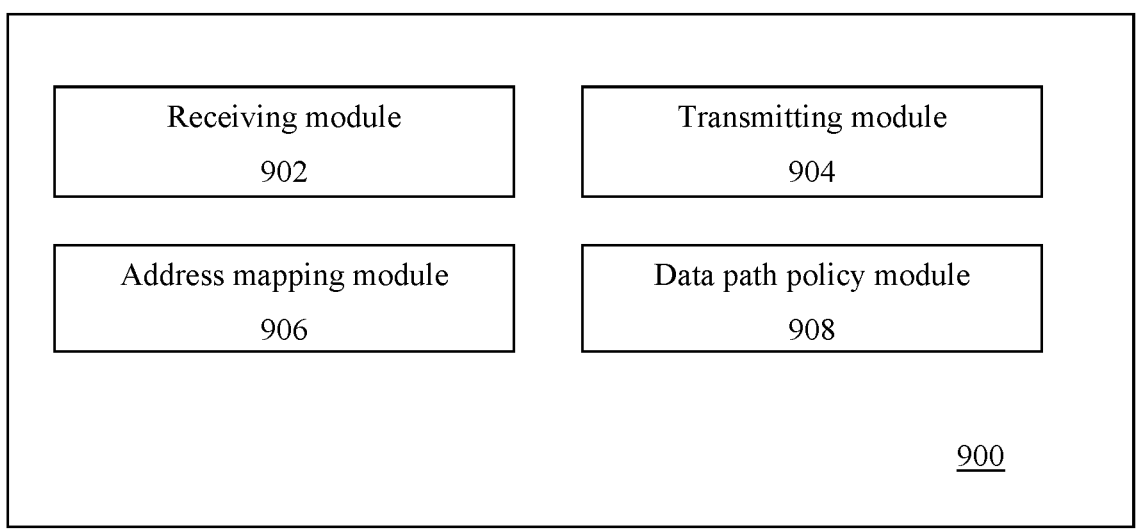
FIG. 9 is a block diagram of a network virtualization edge node.

FIG. 9 is a block diagram of an example network virtualization edge (NVE) node 900. The NVE node 900 can include a receiving module 902, a transmitting module 904, an address mapping module 906, and a data path policy module 908. The receiving module 902 can be configured to receive data packets, data path notification messages and/or tenant configuration signaling. The transmitting module 904 can be configured to transmit data path notification messages and/or forward data packets. The address mapping module 906 can be an inner-outer address mapping table, as described herein, configured to translate overlay network addresses to underlay network addresses and vice versa. The data path policy 908 module can be configured to store and enforce data path forwarding rules in association with the address mapping module 906. According to some embodiments, the receiving module 902 is configured for receiving a data path notification message from a peer node, the data path notification message including forwarding policy information, and for receiving a packet, the packet having a first overlay network address destination. The address mapping module 906 is configured for determining that the first overlay network address maps to a plurality of underlay network addresses. The data path policy module 908 is configured for selecting one of the plurality of underlay network addresses in accordance with the received forwarding policy information. The transmitting module 904 is configured for forwarding the packet to the selected underlay network address.

Embodiments of the present invention can be used to dynamically update a peer NVE with data path forwarding information. These updates can be triggered by a status change in an attached tenant system or by an NVA decision. The NVE-NVE data plane messaging format can be used to communicate and distribute the data path information without requiring a stand-alone control message.

Embodiments of the present invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for handling packet traffic by an overlay network node, comprising:
  receiving a data path notification message from a peer node, the data path notification message including forwarding policy information;
  receiving a packet, the packet having a first overlay network address destination;
  determining that the first overlay network address destination maps to a plurality of underlay network addresses;
  selecting one of the plurality of underlay network addresses in accordance with the received forwarding policy information; and
  forwarding the packet to the selected underlay network address.

2. The method of claim 1, wherein the forwarding policy information is indicated in an encapsulation header of the data path notification message.

3. The method of claim 1, wherein the forwarding policy information is based at least in part on user plane signaling received by the peer node from a tenant system.

4. The method of claim 1, further comprising, updating an overlay network to underlay network address mapping table in accordance with the received forwarding policy information.

5. The method of claim 1, wherein determining that the first overlay network address destination maps to a plurality of underlay network addresses includes looking up the first overlay network address destination in an overlay network to underlay network address mapping table.

6. The method of claim 1, wherein the forwarding policy information indicates a preferred underlay network path for reaching the first overlay network address destination.

7. The method of claim 1, wherein the forwarding policy information indicates that packet traffic addressed to the first overlay network address destination is to be load balanced between the plurality of underlay network addresses.

8. The method of claim 1, wherein the forwarding policy information indicates a status of a tenant system associated with the first overlay network address destination.

9. The method of claim 1, further comprising, informing a tenant system attached to the overlay network node of the forwarding policy information.

10. The method of claim 1, wherein the overlay network is a Network Virtualization using Overlays over Layer 3 (NVO3) network.

11. The method of claim 1, wherein the overlay network node is a Network Virtualization Edge (NVE).

12. An overlay network node comprising circuitry including a processor and a memory, the memory containing instructions executable by the processor whereby the overlay network node is operative to:
  receive a data path notification message from a peer node, the data path notification message including forwarding policy information;
  receive a packet, the packet having a first overlay network address destination;
  determine that the first overlay network address destination maps to a plurality of underlay network addresses;
  select one of the plurality of underlay network addresses in accordance with the received forwarding policy information; and
  forward the packet to the selected underlay network address.

13. The overlay network node of claim 12, wherein the forwarding policy information is indicated in an encapsulation header of the data path notification message.

14. The overlay network node of claim 12, wherein the forwarding policy information is based at least in part on user plane signaling received by the peer node from a tenant system.

15. The overlay network node of claim 12, further operative to, update an overlay network to underlay network address mapping table in accordance with the received forwarding policy information.

16. The overlay network node of claim 12, wherein determining that the first overlay network address destination maps to a plurality of underlay network addresses includes looking up the first overlay network address destination in an overlay network to underlay network address mapping table.

17. The overlay network node of claim 12, wherein the forwarding policy information indicates a preferred underlay network path for reaching the first overlay network address destination.

18. The overlay network node of claim 12, wherein the forwarding policy information indicates that packet traffic addressed to the first overlay network address destination is to be load balanced between the plurality of underlay network addresses.

19. The overlay network node of claim 12, wherein the forwarding policy information indicates a status of a tenant system associated with the first overlay network address destination.

20. The overlay network node of claim 12, further operative to, inform a tenant system attached to the overlay network node of the forwarding policy information.

* * * * *